(12) United States Patent
Wang

(10) Patent No.: US 10,686,803 B2
(45) Date of Patent: Jun. 16, 2020

(54) ENHANCING PROCESSING EFFICIENCY OF BLOCKCHAIN TECHNOLOGIES USING PARALLEL SERVICE DATA PROCESSING

(71) Applicant: Alibaba Group Holding Limited, George Town (KY)

(72) Inventor: Shifeng Wang, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 0 days.

(21) Appl. No.: 15/992,918

(22) Filed: May 30, 2018

(65) Prior Publication Data

US 2018/0351732 A1    Dec. 6, 2018

(30) Foreign Application Priority Data

May 31, 2017    (CN) .......................... 2017 1 0397591

(51) Int. Cl.

| H04L 29/06 | (2006.01) |
| G06F 16/18 | (2019.01) |
| G06Q 20/06 | (2012.01) |
| H04L 9/32 | (2006.01) |
| G06Q 20/02 | (2012.01) |

(Continued)

(52) U.S. Cl.
CPC .............. *H04L 63/12* (2013.01); *G06F 3/064* (2013.01); *G06F 16/1805* (2019.01); *G06Q 20/02* (2013.01); *G06Q 20/065* (2013.01); *H04L 9/0637* (2013.01); *H04L 9/3239* (2013.01);

(Continued)

(58) Field of Classification Search
CPC ....... H04L 9/0637; H04L 9/3239; H04L 9/32; H04L 63/12; H04L 2209/125; H04L 2209/38; H04L 67/10; H04L 67/1095; H04L 67/16; H04L 67/32; G06F 16/1805;
(Continued)

(56) References Cited

U.S. PATENT DOCUMENTS 10,121,025 B1 * 11/2018 Rice .......................... H04L 9/30
10,521,780 B1 * 12/2019 Hopkins, III .......... G06Q 20/10
(Continued)

FOREIGN PATENT DOCUMENTS

| CN | 106415530 | 2/2017 |
| CN | 106445711 | 2/2017 |

(Continued)

OTHER PUBLICATIONS

Ben-Ari, "Blockchain as a database" Linkedin, Jul. 2015, pp. 1-6, https://www.linkedin.com/pulse/blockchain-database-adi-ben-ari (Year: 2015).*

(Continued)

*Primary Examiner* — Theodore C Parsons
*Assistant Examiner* — Thomas Ho
(74) *Attorney, Agent, or Firm* — Fish & Richardson P.C.

(57) ABSTRACT

A validation-ready preprocessing block in a current consensus round is obtained by a blockchain node and in a service consensus stage. The validation-ready preprocessing block is validated. If it is determined that the validation-ready preprocessing block is validated, validation is started on a next validation-ready preprocessing block and parallel data processing is performed on service data stored in the validated validation-ready preprocessing block.

17 Claims, 4 Drawing Sheets

(51) Int. Cl.
*G06F 3/06* (2006.01)
*H04L 9/06* (2006.01)

(52) U.S. Cl.
CPC .... *G06Q 2220/00* (2013.01); *H04L 2209/125* (2013.01); *H04L 2209/38* (2013.01)

(58) Field of Classification Search
CPC ........... G06F 3/06; G06F 9/546; G06Q 20/02; G06Q 20/065; G06Q 2220/00
See application file for complete search history.

(56) References Cited

U.S. PATENT DOCUMENTS

| | | | |
|---|---|---|---|
| 2009/0287874 A1* | 11/2009 | Rogers | G06F 11/1441 711/103 |
| 2017/0083860 A1 | 3/2017 | Sriram et al. | |
| 2017/0149819 A1 | 5/2017 | Androulaki et al. | |
| 2017/0163733 A1 | 6/2017 | Grefen et al. | |
| 2017/0212781 A1* | 7/2017 | Dillenberger | G06F 9/5038 |
| 2017/0329980 A1 | 11/2017 | Hu et al. | |
| 2018/0129945 A1 | 5/2018 | Saxena et al. | |
| 2018/0158034 A1* | 6/2018 | Hunt | G06Q 20/00 |
| 2018/0329944 A1* | 11/2018 | Horii | G06F 16/27 |
| 2018/0329945 A1* | 11/2018 | Horii | G06F 16/27 |
| 2018/0337769 A1* | 11/2018 | Gleichauf | H04L 9/0637 |
| 2019/0130394 A1* | 5/2019 | Stollman | H04L 9/3239 |
| 2019/0190719 A1* | 6/2019 | van de Ruit | G06F 21/64 |
| 2019/0215151 A1 | 7/2019 | Wang | |

FOREIGN PATENT DOCUMENTS

| | | |
|---|---|---|
| CN | 106603698 | 4/2017 |
| CN | 107395353 | † 11/2017 |
| CN | 107396180 | 11/2017 |
| RU | 181439 | 7/2018 |
| TW | 201627889 | 8/2016 |
| WO | WO 2016046820 | 3/2016 |

OTHER PUBLICATIONS

Aelf: "Parallel Processing to Handle Commercial-Scale Transactions and Possibilities for Scaling"; Oct. 31, 2017; 5 pages.
International Search Report and Written Opinion of the International Searching Authority issued in International Application No. PCT/US2018/035478 dated Aug. 21, 2018; 10 pages.
Sankar et al., "Survey of consensus protocols on blockchain applications," 4th International Conference on Advanced Computing and Communication Systems (ICACCS), Jan. 2017, pp. 1-5.
PCT International Preliminary Report on Patentability in International Application No. PCT/US2018/035478, dated Dec. 3, 2019, 7 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

\* cited by examiner
† cited by third party

ENHANCING PROCESSING EFFICIENCY OF BLOCKCHAIN TECHNOLOGIES USING PARALLEL SERVICE DATA PROCESSING

This application claims priority to Chinese Patent Application No. 201710397591.4, filed on May 31, 2017, which is hereby incorporated by reference in its entirety.

TECHNICAL FIELD

The present application relates to the field of computer technologies, and in particular, to a data processing method and apparatus.

BACKGROUND

With the continuous development of computer technologies, the application scope of blockchain technologies has expanded. Currently, many service models have become more effective and secure due to the introduction of the blockchain technologies, so as to serve users more effectively.

In practical applications, service execution processes related to blockchain technologies can be roughly divided into three processes:
1. Service handling stage: In this stage, a blockchain node can receive process-ready service data (which can also be referred to as transaction data) sent by a user by using a terminal or a client, and store the service data after verifying the service data. In this stage, the blockchain node can also receive process-ready service data that is broadcast by another blockchain node, and store the service data in the foregoing recorded manner.
2. Service consensus stage: In this stage, if the blockchain node is used as a master node that initiates consensus, the blockchain node can obtain a part of service data from the stored service data, pack the part of service data into a preprocessing block, and broadcast the preprocessing block to the another blockchain node, so as to validate the preprocessing block. After receiving the preprocessing block, another blockchain node in a consensus network can perform consensus verification on service data in the preprocessing block based on the stored service data. If the blockchain node is not a master node, the blockchain node can receive a preprocessing block that is broadcast by the master node, and perform consensus verification on a service request in the preprocessing block by using a service request stored in a memory of the blockchain node.
3. Service submission stage: In this stage, after determining that the preprocessing block processed in the service consensus stage is validated, the blockchain node can store the service data of the preprocessing block in a blockchain. Additionally, the blockchain node can store the service data in a specified database, and release the service data of the preprocessing block from storage space of the blockchain node.

In existing technology, for a same part of service data, the blockchain node usually first needs to complete the service consensus stage before entering the service submission stage, and the blockchain node can validate a next validation-ready preprocessing block after completing the service submission stage. However, in existing technology, the service consensus stage and the service submission stage in a service data processing process are performed in serial, meaning that the blockchain node can start a service consensus stage of next service data processing after completing a service submission stage of current service data processing. As a result, the time interval between service data processing is increased, and the service processing efficiency of an entire system is reduced.

SUMMARY

An embodiment of the present application provides a data processing method, so as to resolve the current problem of low service processing efficiency in blockchain technologies.

An embodiment of the present application provides a data processing method, including: obtaining, by a blockchain node, a validation-ready preprocessing block, and validating the preprocessing block; and if it is determined that the preprocessing block is validated, starting to validate a next validation-ready preprocessing block, and performing data processing on service data in the validated preprocessing block in parallel.

An embodiment of the present application provides a data processing apparatus, so as to resolve the current problem of relatively low service consensus efficiency.

An embodiment of the present application provides a data processing apparatus, including: an acquisition module, configured to obtain a validation-ready preprocessing block, and validate the preprocessing block; and a processing module, configured to: if it is determined that the preprocessing block is validated, start to validate a next validation-ready preprocessing block, and perform data processing on service data in the validated preprocessing block in parallel.

An embodiment of the present application provides a data processing apparatus, so as to resolve the current problem of relatively low service consensus efficiency.

An embodiment of the present application provides a data processing apparatus, including a memory and at least one processor, where the memory stores a program, and the processor or the processors are configured to perform the following steps: obtaining a validation-ready preprocessing block, and validating the preprocessing block; and if it is determined that the preprocessing block is validated, starting to validate a next validation-ready preprocessing block, and starting to perform data processing on service data in the validated preprocessing block in parallel.

One or more of the described technical solutions used in embodiments of the present application can achieve the following beneficial effects: in the embodiments of the present application, after determining that the obtained preprocessing block is validated, the blockchain node starts to validate the next validation-ready preprocessing block by means of parallel processing, and performs data processing on the service data in the validated preprocessing block. That is, the blockchain node implements parallel service data processing in a service consensus stage and a service submission stage. The blockchain node is not limited to performing data processing on a part of service data in the service submission stage, but can also perform consensus processing on the other part of service data in the service consensus stage. Therefore, a time interval between consensus processing in the service consensus stage can be shortened, so as to effectively improve service data processing efficiency of a system.

BRIEF DESCRIPTION OF DRAWINGS

Drawings described here are used to provide further understanding of the present application, and constitute a part of the present application. Schematic embodiments of the present application and descriptions are used to explain the present application, which do not constitute an improper limitation to the present application. In the drawings.

DESCRIPTION OF EMBODIMENTS

To make a person skilled in the art better understand the technical solutions in the present application, the following disclosure describes the technical solutions in the embodiments of the present application with reference to the accompanying drawings in the embodiments of the present application. The described embodiments are a part rather than all of the possible embodiments of the present application. Other embodiments obtained by a person of ordinary skill in the art that are based on the embodiments of the present application without creative efforts are intended to fall within the protective scope of the present application.

Figure 1:
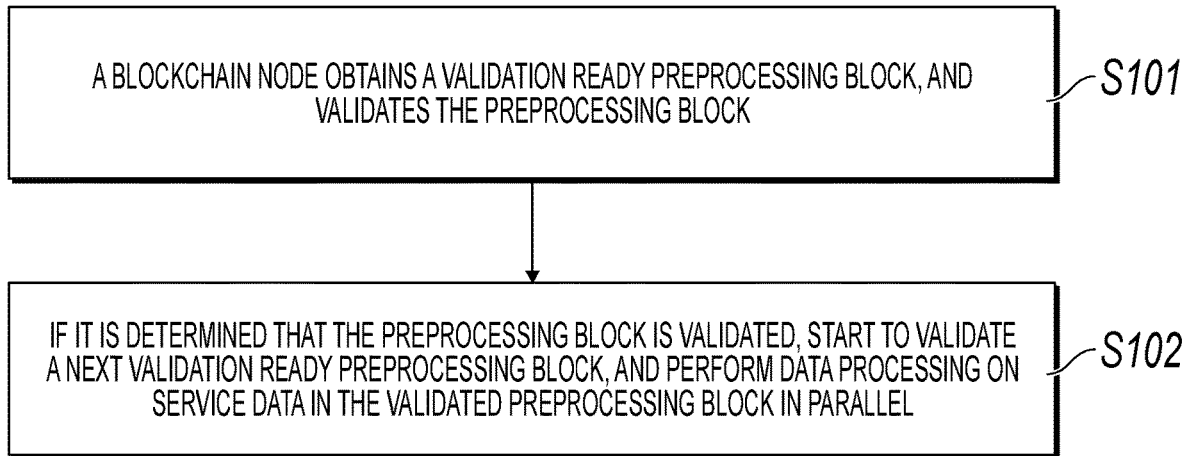
FIG. 1 is a schematic diagram illustrating a data processing process, according to an embodiment of the present application.

FIG. 1 is a schematic diagram illustrating a data processing process, according to an embodiment of the present application. The data processing process includes the following steps.

S101. A blockchain node obtains a validation-ready preprocessing block, and validates the preprocessing block.

In this embodiment of the present application, the blockchain node can obtain, in a service consensus stage, a preprocessing block in the current consensus round (here a preprocessing block currently obtained is referred to as a preprocessing block obtained in current consensus). The preprocessing block can be generated by the blockchain node based on service data stored by the blockchain node, or can be obtained from another blockchain node.

S102. If it is determined that the preprocessing block is validated, start to validate a next validation-ready preprocessing block, and perform data processing on service data in the validated preprocessing block in parallel.

After determining that consensus verification of a current validation-ready preprocessing block succeeds, the described blockchain node can perform, by means of parallel processing, data processing in a service submission stage on the validated preprocessing block. Therefore, when consensus processing in the service consensus stage is performed on a next preprocessing block, data processing in the service submission stage can be effectively and synchronously performed on the validated preprocessing block.

It can be seen that, in this embodiment of the present application and in the service data processing process, a service consensus node synchronously performs consensus processing in the service consensus stage and data processing in the service submission stage. Assume that there are at least two validation-ready preprocessing blocks. Therefore, based on the technical solutions provided in the present application, when data processing is performed on a validated preprocessing block in the service submission stage, consensus processing can be performed synchronously on a preprocessing block with failed consensus in the service consensus stage.

It should be noted that, for the current validation-ready preprocessing block, a determination is made when consensus processing is performed on the current validation-ready preprocessing block. Consensus processing starts to be performed on the next validation-ready preprocessing block, and processing parameters of a current validated preprocessing block are obtained. Therefore, a processor (which can be referred to as a predetermined processor) can be configured to implement data processing in a service submission stage in a service data processing process that performs, based on the processing parameters, data processing on the current validated preprocessing block.

For example, when starting to perform consensus processing on the next validation-ready preprocessing block, the predetermined processor performs, based on a generated processing parameter, data processing on the current validated preprocessing block. It can be understood here that consensus processing and data processing are respectively performed on the next validation-ready preprocessing block and the current validated preprocessing block in parallel, so that a time interval between consensus processing performed on the current validation-ready preprocessing block and consensus processing performed on the next validation-ready preprocessing block is effectively shortened.

For another example, when starting to perform consensus processing on the next validation-ready preprocessing block, the predetermined processor performs data processing on the current validated preprocessing block, and then stores the current validated preprocessing block in a predetermined queue for waiting. The predetermined processor successively performs, based on a rule (for example, based on a consensus completion time sequence), data processing on validated preprocessing blocks stored in the queue. It can be understood here that consensus processing of the current validation-ready preprocessing block and data processing of the preprocessing block are asynchronously completed.

For example, assume that there are three preprocessing blocks: A, B, and C, and the three preprocessing blocks are successively sent to the blockchain node in an alphabetical sequence for consensus. After determining that a preprocessing block A is validated, the blockchain node can perform data processing on the preprocessing block A by using the predetermined processor. Additionally, the blockchain node can validate a preprocessing block B. After determining that the preprocessing block B is validated and finding that data processing performed on the preprocessing block A is not completed, the blockchain node can store the validated preprocessing block B in a predetermined queue for waiting, and continue to validate a preprocessing block C. When determining that data processing performed on the preprocessing block A is completed, the blockchain node can extract the preprocessing block B from the predetermined queue, so as to perform data processing on the preprocessing block B by using the predetermined processor.

Therefore, for each preprocessing block, consensus processing and data processing of the preprocessing block are completed asynchronously. For different preprocessing blocks, consensus processing of a preprocessing block and data processing of another validated preprocessing block can be performed synchronously.

After the blockchain node determines that the consensus verification of the current validation-ready preprocessing block succeeds, this embodiment of the present application includes, but is not limited to, performing the following two types of operations:

1. First-Type Operation

In a first-type operation, a processing parameter corresponding to the current validated preprocessing block is determined. The processing parameter includes a parameter used for processing service data in the preprocessing block, so that the predetermined processor can process the preprocessing block based on the processing parameter, thereby completing a related operation in the service submission stage. The following describes the first-type operation in detail.

The processing parameter can include, but is not limited to, a storage parameter, a release parameter, a deletion parameter, and a co-chain parameter. However, the above is merely a simple example used to describe some parameters in the processing parameter. In practical application, the processing parameter can further include other parameters, and this can be determined based on a specific operation performed by the blockchain node in the service submission stage.

For example, the release parameter is used to instruct to release a validated preprocessing block from storage space.

The storage parameter is used to instruct to store service data of a validated preprocessing block in a specified location. Different storage parameters are determined for different preprocessing blocks. The storage parameter includes a storage location.

The deletion parameter is instructed to delete a message (for example, a pre-preparation message, a preparation message, and an acknowledgement message in the practical byzantine fault tolerance algorithm (PBFT) consensus) generated by a validated preprocessing block in a service consensus stage to reduce storage pressure.

The co-chain parameter is used to instruct to co-chain, in a block form based on a header hash of a previous block in a preprocessing block, the preprocessing block to a blockchain that the previous block is located on.

Preferably, in this embodiment of the present application, when validating the next adjacent validation-ready preprocessing block, the blockchain node can further process service data in the current validated preprocessing block in parallel by using the predetermined processor.

Assume that in the existing technology, it can be understood that the blockchain node completes a service consensus stage and a service submission stage in a service data processing process by using the same thread. The blockchain node first needs to complete the service consensus stage in this service data processing process by using the thread, and then performs the service submission stage in this service data processing process by using the thread. Apparently, in the existing technology, the blockchain node performs the service consensus stage and the service submission stage in the service data processing process in serial. As a result, a time interval between adjacent service data processing is increased, and service data processing efficiency is reduced.

To effectively resolve the described problem, in this embodiment of the present application, the blockchain node pre-configures a processor (the processor can operate by means of asynchronous processing, and no specific limitation is imposed). The processor can be configured to perform an operation involved in the service submission stage. That is, in this embodiment of the present application, the blockchain node can respectively implement consensus processing in the service consensus stage and data processing in the service submission stage in the service data processing process by using two threads. One thread is used to perform consensus processing on a validation-ready preprocessing block, and the other thread is used to perform data processing on a validated preprocessing block. Therefore, for a same preprocessing block, consensus processing and data processing are asynchronously completed.

As such, when the blockchain node performs, by using the processor, the operation involved in the service submission stage, the blockchain node can start, without being affected, to validate the next adjacent validation-ready preprocessing block, that is, start to perform next consensus, so as to greatly shorten a time interval between adjacent consensuses, thereby improving consensus efficiency.

In this embodiment of the present application, all processing parameters determined in the current consensus can be obtained by using processing parameters determined in previous consensus.

The storage parameter is used as an example for description. After determining that the current validation-ready preprocessing block is validated, the blockchain node can determine, based on a storage parameter of the current validated preprocessing block, a storage parameter of a next adjacent validation-ready preprocessing block, and store the storage parameter of the next adjacent validation-ready preprocessing block.

For example, assume that the storage parameter corresponding to the current validated preprocessing block (which can also be understood as a storage parameter corresponding to the current consensus) defines that the service data in the current validated preprocessing block needs to be stored in a table a in a relationship-type database A. Therefore, the blockchain node can determine, based on an alphabetical sequence of each table in the relationship-type database A, that the storage parameter corresponding to the next adjacent validated preprocessing block is: storing, in a table b in the relationship-type database A, service data in a preprocessing block whose current consensus (that is, the next adjacent consensus mentioned above) succeeds.

The blockchain node can store a determined storage parameter of the next consensus. Therefore, when it is determined that the next validation-ready preprocessing block is validated, the predetermined processor can determine, based on the obtained storage parameter, a table and a database that service data in the validated preprocessing block needs to be stored in.

Preferably, in this embodiment of the present application, after determining that the current validation-ready preprocessing block is validated, the blockchain node can also determine, based on the preprocessing block and the storage parameter of the preprocessing block, a storage parameter of a next adjacent validation-ready preprocessing block, and store the storage parameter of the next adjacent validation-ready preprocessing block.

Specifically, if the storage location in the storage parameter exists in a form of a base pointer. A location pointed by the base pointer is a storage location of service data in a preprocessing block. After determining that the current validation-ready preprocessing block is validated, the blockchain node can use a current location of the base pointer as a start point, move a location of the base pointer based on a size of the current validation-ready preprocessing block, and determine that a new location of the base pointer is a storage parameter corresponding to next consensus, which is the storage parameter of the next adjacent validation-ready preprocessing block.

For example, assume that a processing parameter of each consensus includes a storage parameter in a form of a base pointer. The base pointer (that is, the storage parameter) points to a specific storage location of the service data. An initial value of the base pointer can be set to 0. After each consensus, the blockchain node can determine, based on a size of a validated preprocessing block and a base pointer in a processing parameter corresponding to current consensus, a specific value of the base pointer in a processing parameter corresponding to the next adjacent consensus. During first consensus, the blockchain node determines that a validated preprocessing block is 1024 bytes, so that the blockchain node can determine, based on the determined size of the preprocessing block and the initial value 0 of the base pointer, that a base pointer in a processing parameter corresponding to second consensus is 1024 bytes, and store the base pointer. Correspondingly, in the second consensus, the blockchain node can store, by using the processor, service data of a validated preprocessing block in a storage location corresponding to the base pointer of 1024 bytes.

In the second consensus, the blockchain node determines that the validated preprocessing block is 10 bytes, so that the blockchain node can determine, based on the determined size of the validated preprocessing block and the base pointer of 1024 bytes in the processing parameter corresponding to previous consensus (that is, the first consensus), that a base pointer in a processing parameter corresponding to third consensus is 1034 bytes, and store the base pointer. Correspondingly, in the third consensus, the blockchain node can store, by using the processor, service data of a validated preprocessing block in a storage location corresponding to the base pointer of 1034 bytes, and subsequent consensus can be deduced.

It should be noted that, in this embodiment of the present application, the storage parameter in the processing parameters corresponding to the next consensus can be determined based on a size of the current validated preprocessing block in addition to other information about the preprocessing block. Information to be used for determining the storage parameter can be determined by an operation and maintenance engineer of the blockchain node. Details are not described here.

It should be noted that, for different parameters in the processing parameters, an operation performed by the blockchain node in the service submission stage can determine whether these parameters need to change after each consensus. For example, for the described storage parameter, because service data in a preprocessing block involved in each consensus cannot be stored in a same storage location, the storage parameter needs to accordingly change after each consensus. For the described co-chain parameter, regardless of which consensus related to a preprocessing block, all preprocessing blocks need to be stored in a blockchain in a block form once consensus in a consensus network succeeds. That is, regardless of a preprocessing block, all processors need to perform a co-chain operation on the preprocessing block once the preprocessing block is validated. Therefore, after each consensus, the co-chain parameter does not need to change accordingly. For each consensus, the co-chain parameter can be consistent.

Preferably, in this embodiment of the present application, the blockchain node can store the obtained processing parameter of the next consensus in the predetermined queue. For example, a storage parameter of a preprocessing block undergoing next adjacent service consensus is stored in the predetermined queue.

As such, the processor can obtain the processing parameter from the predetermined queue (that is, obtain the processing parameter of the validated preprocessing block) to store, based on the storage parameter in the processing parameters, the service data in the validated preprocessing block corresponding to the storage parameter.

The predetermined queue mentioned here can be a first-in first-out (FIFO) queue, or can be a queue of another type. No specific limitation is imposed here. The processor can obtain a processing parameter stored in the FIFO queue, and determine, from the stored validated preprocessing block based on the storage parameter in the processing parameters, a preprocessing block corresponding to the storage parameter, so as to store the service data of the preprocessing block based on the storage parameter.

Specifically, the processor can obtain the storage parameter from the described FIFO queue, and then the processor can further determine a process-ready preprocessing block corresponding to the storage parameter. For example, when the current validation-ready preprocessing block is validated, the blockchain node generates a storage parameter of the preprocessing block, and determines a correspondence between the preprocessing block and the storage parameter. Therefore, the processor can determine, based on the correspondence, the process-ready preprocessing block corresponding to the storage parameter. For another example, when the current validation-ready preprocessing block is validated, the blockchain node generates a storage parameter of the preprocessing block, determines a first time the storage parameter is generated, determines a second time the current validation-ready preprocessing block is validated, and establishes a correspondence between the first time and the second time. Therefore, the processor can search for, based on the generation time of the storage parameter, a preprocessing block corresponding to a consensus processing ending time that satisfies a determined condition in the generation time. It can be determined that the found preprocessing block is the process-ready preprocessing block corresponding to the storage parameter. For another example, the processor obtains, from the FIFO queue, a storage parameter at the forefront of a queue exit. Therefore, the processor searches for a validated preprocessing block with a head-most storage location from storage space of the blockchain node, and determines that the preprocessing block is a preprocessing block corresponding to the storage parameter.

After determining the process-ready preprocessing block corresponding to the storage parameter, the processor can store, based on the storage parameter, service data in the process-ready preprocessing block in a storage location specified by the storage parameter.

It should be noted that, in this embodiment of the present application, in addition to using the FIFO queue, the blockchain node can further store each processing parameter by using another queue, for example, a double-ended queue. Details are not described here.

The processor can store, based on the storage parameter in the obtained processing parameters, the service data of the process-ready preprocessing block corresponding to the storage parameter. Additionally, the processor can further perform another operation on the process-ready preprocessing block based on another parameter in the processing parameters.

For example, the processor can release the service data in the process-ready preprocessing block from the storage space based on the release parameter in the processing parameters. For another example, the processor can delete, based on the deletion parameter in the obtained processing parameters, a pre-preparation message, a preparation message, an acknowledgement message, etc. generated in the service consensus stage in the current consensus, so as to save the storage space of the blockchain node. The processor can further perform another operation based on another parameter in the processing parameters, and details are not described here.

2. Second-Type Operation

In a second-type operation, based on a consensus parameter corresponding to current consensus, a consensus parameter corresponding to next consensus is updated. That is, the blockchain node can determine a consensus parameter corresponding to the current validated preprocessing block, and obtain, based on the determined consensus parameter, a consensus parameter corresponding to the next adjacent validation-ready preprocessing block.

It should be noted that, in this embodiment of the present application, after determining that consensus verification of a preprocessing block that needs to be validated in the current negation is validated, the blockchain node needs to obtain and store, based on a processing parameter corresponding to the current consensus, a processing parameter corresponding to the next consensus. Additionally, the blockchain node can further update, based on the consensus parameter corresponding to the current consensus, the consensus parameter corresponding to the next consensus. That is, the blockchain node can determine the consensus parameter corresponding to the current validated preprocessing block, and obtain, based on the determined consensus parameter, the consensus parameter corresponding to the next adjacent validation-ready preprocessing block.

The consensus parameter mentioned here can be understood as attribute information corresponding to one-time consensus. For example, PBFT consensus is used as an example for description. In a PBFT consensus process, one-time consensus usually corresponds to one view number v, and the view number v is used to uniquely identify this consensus. In one-time consensus, regardless of which blockchain node in a consensus network is used as a master node, a header hash of a previous block in a preprocessing block generated by the blockchain node is usually a header hash of a current last block on the blockchain. The view number v and the header hash of the previous block mentioned here can be referred to as consensus parameters corresponding to the current consensus.

In addition to the described view number v and the header hash of the previous block, the consensus parameter can further include other information. For different consensus types, there can be a specific difference in content in the consensus parameter. Details are not described here.

After determining that the consensus verification of the current validation-ready preprocessing block succeeds, the blockchain node can further determine the consensus parameter corresponding to the current consensus to obtain a consensus parameter corresponding to next consensus by updating the consensus parameter, that is, to obtain the consensus parameter corresponding to the next adjacent validation-ready preprocessing block.

A PBFT consensus manner is still used as an example. Assume that the consensus parameter corresponding to the current consensus includes the view number v and the header hash of the previous block. The view number v is 16, and the header hash of the previous block is 0929d9s1dom23oix239xed. After determining that the consensus verification of the current validation-ready preprocessing block succeeds, the blockchain node can update the view number v from 16 to 17, and update, to 679xx9a9a8dfa23389xx34 based on a header hash of the preprocessing block of 679xx9a9a8dfa23389xx34, a header hash of a block for the next consensus. As such, the consensus parameter corresponding to the next consensus is: the view number v is 17, and the header hash of the previous block is 679xx9a9a8dfa23389xx34.

The blockchain node can obtain, based on the consensus parameter corresponding to the current consensus, the consensus parameter corresponding to the next consensus. As such, the blockchain node can start, based on the obtained consensus parameter corresponding to the next consensus, to validate the next adjacent validation-ready preprocessing block. The consensus parameter mentioned here can be stored in a memory, can be stored in a database corresponding to the blockchain node, or can exist in a global variable.

It should be noted that, in this embodiment of the present application, the consensus parameter can also be stored in the predetermined queue corresponding to the processing parameter. As such, a processor configured to perform consensus processing can obtain a consensus parameter from the predetermined queue, and start new consensus processing based on the consensus parameter. A processor configured to perform data processing obtains a processing parameter from the predetermined queue, and starts, based on the obtained processing parameter, to perform data processing on service data in a preprocessing block corresponding to the processing parameter.

For example, assume that the processor obtains, from the FIFO queue, a processing parameter and a consensus parameter corresponding to the processing parameter, and the consensus parameter includes the view number v. As such, the processor can determine, from the storage space of the blockchain node, a process-ready preprocessing block corresponding to the view number v, so as to process the process-ready preprocessing block based on the obtained processing parameter.

In this embodiment of the present application, the processing parameter cannot exist in the described predetermined queue. For example, the processing parameter can be stored in the memory of the blockchain node, can be stored in a database corresponding to the blockchain node, or can be stored in another location of the blockchain node. Details are not described here.

It can be seen from the foregoing method that, after determining that the obtained preprocessing block is validated, the blockchain node starts to validate the next validation-ready preprocessing block by means of parallel processing, and processes the service data in the validated preprocessing block. That is, the blockchain node implements parallel service data processing in a service consensus stage and a service submission stage. The blockchain node is not limited to performing data processing on a part of service data in the service submission stage, but can also perform consensus processing on the other part of service data in the service consensus stage. Therefore, a time interval between adjacent consensus processing in the service consensus stage can be shortened, so as to effectively improve service data processing efficiency of a system.

Figure 2:
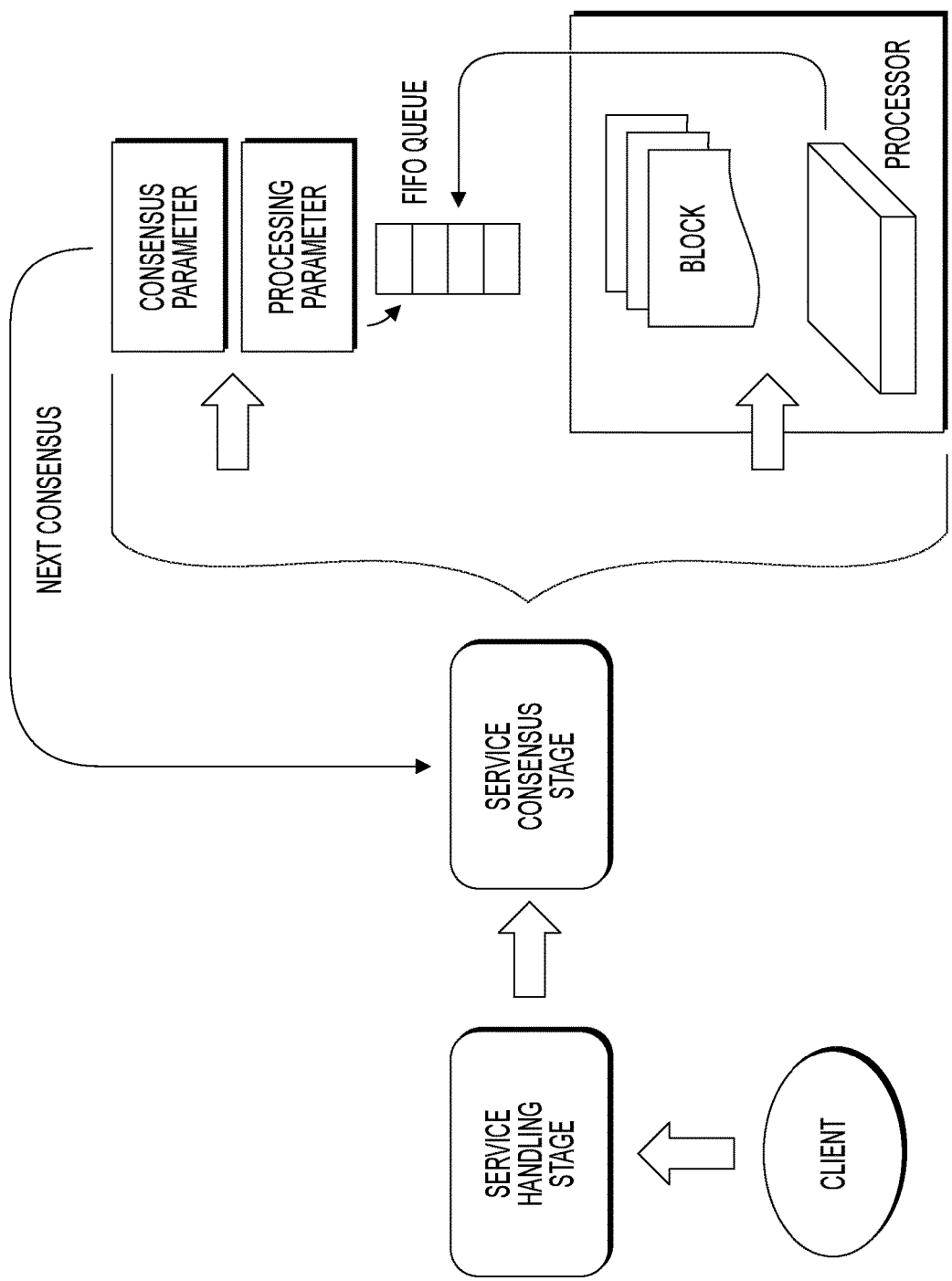
FIG. 2 is a schematic diagram illustrating data processing performed by a blockchain node, according to an embodiment of the present application.

As shown in FIG. 2, to further describe the data processing method mentioned in the present application, the following briefly describes in detail all processes involved in the data processing method.

FIG. 2 is a schematic diagram illustrating data processing performed by a blockchain node, according to an embodiment of the present application.

In a service handling stage, a user can send service data to a blockchain node by using a client installed in a terminal, and the blockchain node can verify the received service data, and store the verified service data in storage space corresponding to the blockchain node.

In a service consensus stage, the blockchain node can obtain a current validation-ready preprocessing block. If the blockchain node is used as a master node that initiates current consensus, the blockchain node can obtain a part of service data from its storage space and pack the part of service data into a preprocessing block. In this situation, the blockchain node obtains a preprocessing block that needs to be validated in the current consensus. Additionally, the blockchain node needs to broadcast the preprocessing block to another blockchain node in a consensus network, so that the another blockchain node performs consensus verification on the preprocessing block.

If the blockchain node is not a master node that initiates the current consensus, the blockchain node can obtain, from the master node that initiates the current consensus, a preprocessing block that needs to be validated in this service consensus, and then perform consensus verification on the preprocessing block.

After determining that the consensus verification of the preprocessing block succeeds, the blockchain node can obtain, by means of updating based on a consensus parameter corresponding to the current consensus (that is, a consensus parameter corresponding to the preprocessing block), a consensus parameter corresponding to next consensus (that is, a consensus parameter corresponding to a next adjacent validation-ready preprocessing block), for performing the next consensus. Additionally, the blockchain node can further obtain, based on the preprocessing block and a processing parameter corresponding to the current consensus (that is, a processing parameter corresponding to a current validated preprocessing block), a processing parameter corresponding to the next consensus (that is, a processing parameter corresponding to the next adjacent validation-ready preprocessing block), and store, in an FIFO queue, the obtained processing parameter corresponding to the next consensus.

When obtaining the consensus parameter and the processing parameter corresponding to the next adjacent consensus, the blockchain node can start to perform a service consensus stage in the next adjacent consensus, that is, start to validate the next adjacent validation-ready preprocessing block. Additionally, when starting to perform the service consensus stage in the next adjacent consensus, the blockchain node can perform a service submission stage in the current consensus in parallel by using a processor.

That is, the blockchain node sends an operation involved in the service submission stage to the processor for completion, and the blockchain node can perform the next adjacent consensus, so as to implement parallel processing of a service consensus stage and a service submission stage in one-time consensus. Therefore, a time interval between adjacent consensuses is shortened, so as to improve consensus efficiency.

The processor can obtain, from the FIFO queue, the processing parameter corresponding to the current consensus, and then store the current validated preprocessing block in a blockchain in a block form based on a co-chain parameter in the processing parameters. The processor can release, based on a yes-or-no parameter and a storage parameter in the processing parameters, the service data of the preprocessing block from the storage space of the blockchain, and store the released service data in a corresponding storage location based on a specification in the storage parameter. The processor can delete, based on a deletion parameter in this processing attribute, for example, a pre-preparation message, a preparation message, or an acknowledgement message of PBFT consensus generated in the service consensus stage, so as to save the storage space of the blockchain node.

Figure 3:
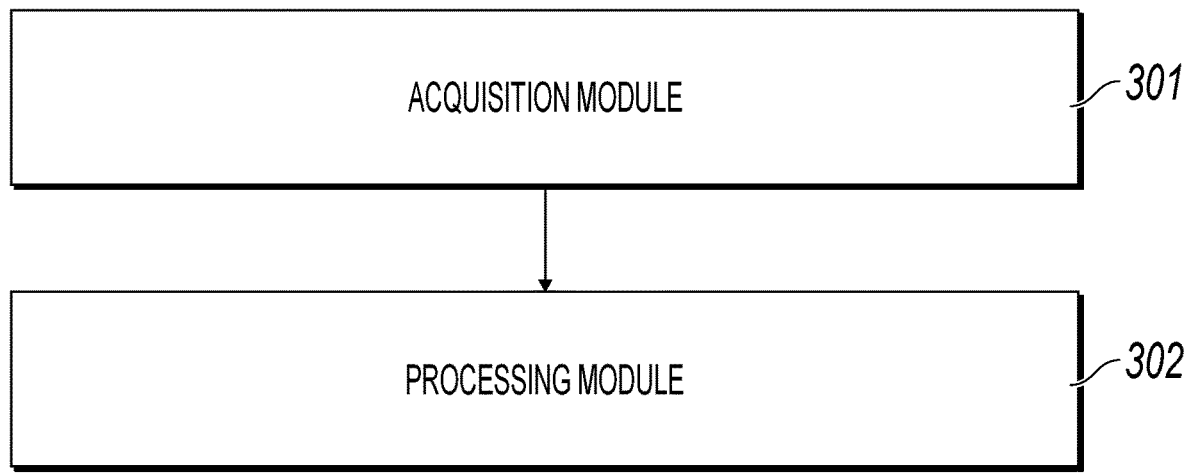
FIG. 3 is a schematic diagram illustrating a data processing apparatus, according to an embodiment of the present application.

The above is the data processing method provided in an embodiment of the present application. As shown in FIG. 3, based on a same idea, an embodiment of the present application further provides a data processing apparatus.

FIG. 3 is a schematic diagram illustrating a data processing apparatus, according to an embodiment of the present application. The apparatus includes: an acquisition module 301, configured to obtain a validation-ready preprocessing block, and validate the preprocessing block; and a processing module 302, configured to: if it is determined that the preprocessing block is validated, start to validate a next validation-ready preprocessing block, and perform data processing on service data in the validated preprocessing block in parallel.

The processing module 302 performs data processing on the service data in the validated preprocessing block in parallel by using a predetermined processor.

For the validated preprocessing block, the processing module 302 performs the following operations: invoking a processor to obtain a storage parameter, where the storage parameter includes a storage location; determining, based on the storage parameter, a process-ready preprocessing block corresponding to the storage parameter; and storing service data of the determined process-ready preprocessing block in the storage location.

After it is determined that the preprocessing block is validated, the acquisition module 301 determines, based on the preprocessing block and the storage parameter of the preprocessing block, a storage parameter of a next adjacent validation-ready preprocessing block, and stores the storage parameter of the next adjacent validation-ready preprocessing block.

The acquisition module 301 stores the storage parameters of the next adjacent validation-ready preprocessing block in a first in first out (FIFO) queue.

The processing module 302 invokes the processor to obtain the storage parameter from the FIFO queue.

If it is determined that the preprocessing block is validated, the acquisition module 301 determines a consensus parameter corresponding to the preprocessing block, and obtains, based on the determined consensus parameter corresponding to the preprocessing block, a consensus parameter corresponding to a next adjacent validation-ready preprocessing block, where the consensus parameter is used to instruct a blockchain node to validate the validation-ready preprocessing block.

When the consensus parameter corresponding to the next adjacent validation-ready preprocessing block is obtained, the processing module 302 starts, based on the obtained consensus parameter, to validate the next adjacent validation-ready preprocessing block.

Based on a same idea, an embodiment of the present application further provides another data processing apparatus. The apparatus specifically includes: a memory and at least one processor, where the memory stores a program, and the at least one processor is configured to perform the following steps: obtaining a validation-ready preprocessing block, and validating the preprocessing block; and if it is determined that the preprocessing block is validated, starting to validate a next validation-ready preprocessing block, and performing data processing on service data in the validated preprocessing block in parallel.

For a specific operation performed by the processor by using the program stored in the memory, reference can be made to content recorded in the described embodiment. The details are not described here.

In the embodiment of the present application, after determining that the obtained preprocessing block is validated, the blockchain node can start to validate the next validation-ready preprocessing block, so as to perform data processing on the service data in the validated preprocessing block in parallel. After determining that the obtained preprocessing block is validated, the blockchain node starts to validate the next validation-ready preprocessing block by means of parallel processing, and processes the service data in the validated preprocessing block. That is, the blockchain node implements parallel service data processing in a service consensus stage and a service submission stage. The blockchain node is not limited to performing data processing on a part of service data in the service submission stage, but can also perform consensus processing on the other part of service data in the service consensus stage. Therefore, a time interval between consensus processing in the service consensus stage can be shortened, so as to effectively improve service data processing efficiency of a system.

In the 1990s, whether technology improvement is hardware improvement (for example, improvement of a circuit structure, such as a diode, a transistor, or a switch) or software improvement (improvement of a method procedure) can be obviously distinguished. However, as technologies develop, improvement of many current method procedures can be considered as direct improvement of a hardware circuit structure. A designer usually programs an improved method procedure to a hardware circuit to obtain a corresponding hardware circuit structure. Therefore, a hardware entity module can improve a method procedure. For example, a programmable logic device (PLD) (for example, a field programmable gate array (FPGA)) is such an integrated circuit, and a logical function of the programmable logic device is determined by a user by means of device programming. The designer performs programming to "integrate" a digital system to a PLD without requesting a chip manufacturer to design and produce an application-specific integrated circuit chip. Additionally, the programming is mostly implemented by modifying "logic compiler" software instead of manually making an integrated circuit chip. This is similar to a software compiler used to develop and compose a program. However, original code obtained before compilation is also written in a specific programming language, and this is referred to as hardware description language (HDL). However, there are various HDLs, such as an ABEL (Advanced Boolean Expression Language), an AHDL (Altera Hardware Description Language), Confluence, a CUPL (Cornell University Programming Language), HDCal, a JHDL (Java Hardware Description Language), Lava, Lola, MyHDL, PALASM, and an RHDL (Ruby Hardware Description Language). Currently, a VHDL (Very-High-Speed Integrated Circuit Hardware Description Language) and Verilog are most popular.

A person skilled in the art should also understand that, because logic programming with respect to the method procedure is performed by using several described hardware description languages, and the several described hardware description languages can be programmed to an integrated circuit, a hardware circuit that implements the logical method procedure can be obtained.

A controller can be implemented in any appropriate manner. For example, the controller can use a microprocessor or a processor, and can store forms of a computer-readable medium, a logic gate, a switch, an application-specific integrated circuit (ASIC), a programmable logic controller, and an embedded microcontroller that are of computer-readable program code (for example, software or hardware) that can be executed by the (micro) processor. The examples of controller include but are not limited to the following microcontrollers: ARC 625D, Atmel AT91SAM, Microchip PIC18F26K20, or Silicone Labs C8051F320. A memory controller can also be implemented as a part of control logic of the memory. A person skilled in the art also knows that, in addition to implementing the controller in a pure computer-readable program code manner, logic programming can be performed for the method step, so that the controller implements a same function in a form of a logical gate, a switch, an application-specific integrated circuit, a programmable logic controller, an embedded microcontroller, etc. Therefore, the controller can be considered as a hardware component, and an apparatus for implementing various functions in the controller can also be considered as a structure in a hardware component. Alternatively, an apparatus configured to implement various functions can be considered as a software module or a structure in a hardware component that can implement the method.

The system, apparatus, module, or unit described in the described embodiments can be specifically implemented by a computer chip or an entity, or implemented by a product with a function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. When the present application is implemented, the functions of each unit can be implemented in one or more pieces of software and/or hardware.

A person skilled in the art should understand that described embodiments can be provided as a method, a system, or a computer program product. Therefore, the described embodiments can use a form of hardware-only embodiments, software-only embodiments, or embodiments with a combination of software and hardware. Additionally, the described embodiments can use a form of a computer program product that is implemented on one or more computer-usable storage media (including, but not limited to, a disk memory, a CD-ROM, an optical memory, etc.) that include computer-usable program code.

Embodiments are described with reference to the flowcharts and/or block diagrams of the method, the device (system), and the computer program product. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions can be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts or in one or more blocks in the block diagrams.

In typical configuration, the computing device includes one or more processors (CPU), an input/output interface, a network interface, and a memory.

The memory can include a form of a volatile memory, a random-access memory (RAM) and/or a non-volatile memory, etc. in a computer-readable medium, such as a read-only memory (ROM) or a flash memory (flash RAM). The memory is an example of the computer-readable medium.

The computer-readable medium includes volatile and non-volatile, removable and non-removable media, and can store information by using any method or technology. The information can be a computer-readable instruction, a data structure, a program module, or other data. A computer storage medium includes, but is not limited to, a parameter random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by the computing device. As described in this specification, the computer-readable medium does not include transitory media, for example, a modulated data signal and a carrier.

It should be further noted that, terms "include", "contain", or their any other variant is intended to cover non-exclusive inclusion, so that a process, a method, an article, or a device that includes a series of elements not only includes these very elements, but can also include other elements which are not expressly listed, or further include elements inherent to such a process, method, article, or device. An element preceded by "includes a . . . " does not, without more constraints, preclude the existence of additional identical elements in the process, method, article, or device that includes the element.

A person skilled in the art should understand that the embodiments of the present application can be provided as a method, a system, or a computer program product. Therefore, the present application can use a form of hardware-only embodiments, software-only embodiments, or embodiments with a combination of software and hardware. Additionally, the present application can use a form of a computer program product that is implemented on one or more computer-usable storage media (including but not limited to a disk memory, a CD-ROM, an optical memory, etc.) that include computer-usable program code.

The present application can be described in common terms of computer-executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

The embodiments in this specification are all described in a progressive manner, for same or similar parts in the embodiments, reference can be made to these embodiments, and each embodiment focuses on a difference from other embodiments. Especially, a system embodiment is basically similar to a method embodiment, and therefore is described briefly; for related parts, reference can be made to partial descriptions in the method embodiment.

The previous descriptions are merely embodiments of the present application, and are not intended to limit the present application. For a person skilled in the art, the present application can have various modifications and changes. Any modifications, equivalent replacements, improvements, etc. made within the spirit and principle of the present application shall fall within the protection scope of the present application.

Figure 4:
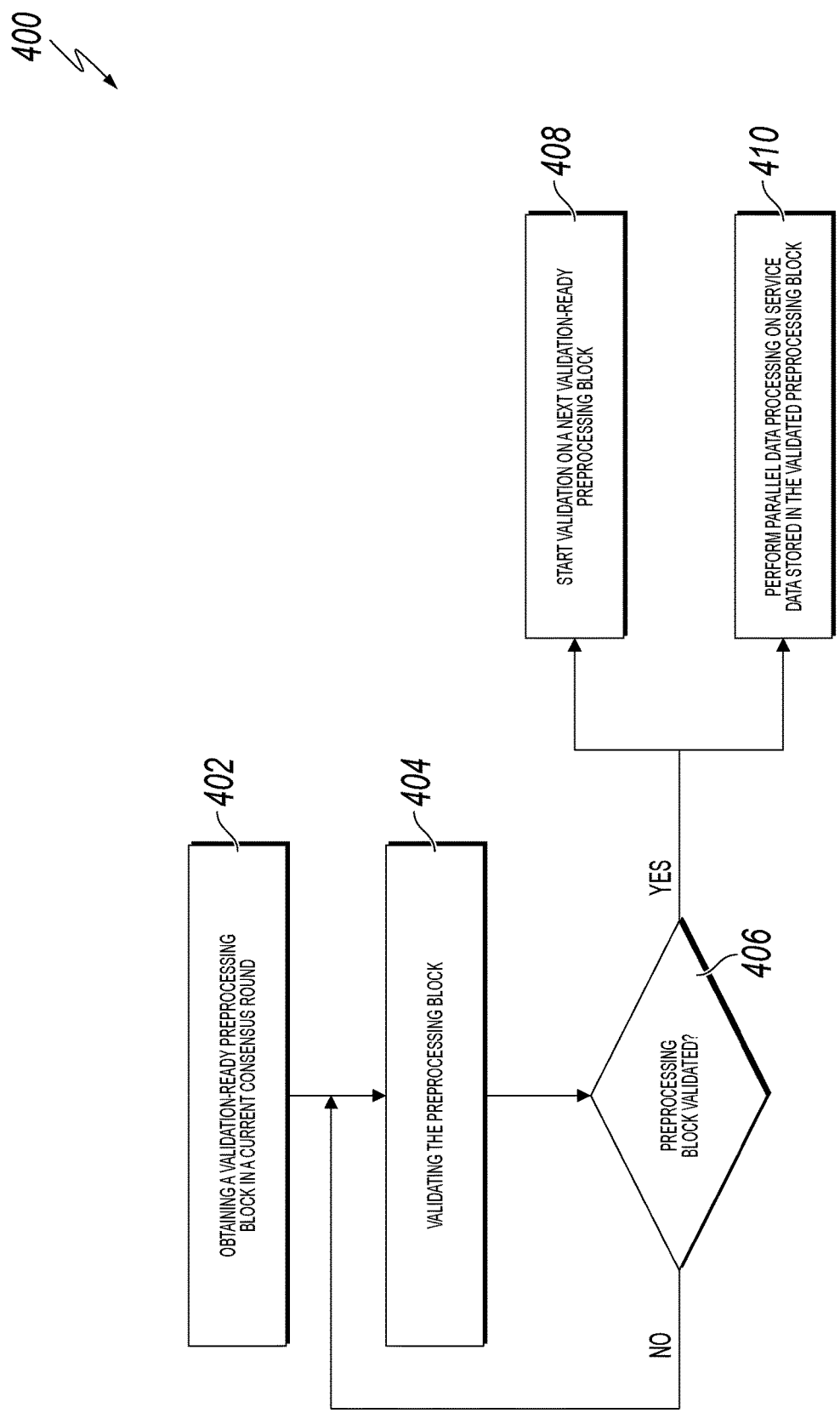
FIG. 4 is a flowchart illustrating an example of a computer-implemented method for enhancing processing efficiency of blockchain technologies using parallel service data processing, according to an implementation of the present disclosure.

FIG. 4 is a flowchart illustrating an example of a computer-implemented method 400 for enhancing processing efficiency of blockchain technologies using parallel service data processing, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, a validation-ready preprocessing block in a current consensus round is obtained by a blockchain node and in a service consensus stage. In some implementations, obtaining the validation-ready preprocessing block includes the blockchain node generating the validation-ready preprocessing block based on service data stored by the blockchain node or obtaining the validation-ready preprocessing block from another blockchain node. From 402, method 400 proceeds to 404.

At 404, the validation-ready preprocessing block is validated. From 404, method 400 proceeds to 406.

At 406, a determination is made as to whether the validation-ready preprocessing block is validated. If it is determined that validation-ready preprocessing block is not validated, method 400 proceeds back to 404. Otherwise, if it is determined that the validation-ready preprocessing block is validated, method 400 proceeds, in parallel, to both 408 and 410.

At 408, validation is started on a next validation-ready preprocessing block. In some implementations, after it is determined that the validation-ready preprocessing block is validated: 1) determining, based on the validation-ready preprocessing block and the storage parameter of the validation-ready preprocessing block, a storage parameter of a next adjacent validation-ready preprocessing block; and 2)

storing the storage parameter of the next adjacent validation-ready preprocessing block. In some implementations, if it is determined that the validation-ready preprocessing block is validated: 1) determining a consensus parameter corresponding to the validation-ready preprocessing block; and 2) obtaining, based on the consensus parameter, a consensus parameter corresponding to a next adjacent validation-ready preprocessing block, where the consensus parameter is used to instruct the blockchain node to validate the next adjacent validation-ready preprocessing block. In some implementations validation is started on the next adjacent validation-ready preprocessing block when the consensus parameter corresponding to the next adjacent validation-ready preprocessing block is obtained.

At 410, parallel data processing is performed on service data stored in the validated validation-ready preprocessing block. In some implementations, the parallel data processing is performed on the service data stored in the validated validation-ready preprocessing block by using a predetermined processor. In some implementations, the parallel data processing using the predetermined processor includes, for the validated validation-ready preprocessing block: 1) invoking a processor to obtain a storage parameter comprising a storage location; 2) determining, based on the storage parameter, a process-ready preprocessing block corresponding to the storage parameter; and 3) storing, in the storage location, service data of the process-ready preprocessing block.

Implementations of the subject matter described in this specification can be implemented so as to realize particular advantages or technical effects. For example, implementations of the described subject matter permits enhanced processing efficiency of blockchain technologies using parallel service data processing. In turn, the more efficient processing can help to enhance overall data security. The described parallel service data processing also permits more efficient usage of computer resources (for example, processing cycles and memory usage) as well as faster processing. At least these actions can minimize or prevent waste of available computer resources with respect to blockchain-based transactions. In some cases, network transaction speed can be increased due to more efficient blockchain processing.

In some implementations, blockchain data can be sent between computing devices and include graphical information (for example, to use on a graphical user interface). In these implementations, elements of a graphical user interface executing on one or more computing devices can be positioned to be least obtrusive for a user. For example, the elements can be positioned in a way to obscure the least amount of data and to avoid covering any critical or often-used graphical user interface elements.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. Additionally, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    obtaining, by a blockchain node and in a service consensus stage, a validation-ready preprocessing block in a current consensus round;
    validating, by the blockchain node, the validation-ready preprocessing block;
    determining a consensus parameter corresponding to the validation-ready preprocessing block;
    obtaining, based on the consensus parameter corresponding to the validation-ready preprocessing block, a consensus parameter corresponding to a next adjacent validation-ready preprocessing block; and
    in response to obtaining the consensus parameter corresponding to the next-adjacent validation-ready preprocessing block, performing, in parallel, by the blockchain node, processing of service data stored in the validated validation-ready preprocessing block and validation of the next adjacent validation-ready preprocessing block.

2. The computer-implemented method of claim 1, wherein obtaining the validation-ready preprocessing block includes the blockchain node generating the validation-ready preprocessing block based on service data stored by the blockchain node or obtaining the validation-ready preprocessing block from another blockchain node.

3. The computer-implemented method of claim 1, wherein the processing of service data is performed by using a predetermined processor.

4. The computer-implemented method of claim 3, wherein the processing of service data by using a predetermined processor further comprises, for the validated validation-ready preprocessing block:
    invoking a processor to obtain a storage parameter comprising a storage location;
    determining, based on the storage parameter, a process-ready preprocessing block corresponding to the storage parameter; and
    storing, in the storage location, service data of the process-ready preprocessing block.

5. The computer-implemented method of claim 4, further comprising, upon validating the validation-ready preprocessing block:
    determining, based on the storage parameter of the validation-ready preprocessing block, a storage parameter of the next adjacent validation-ready preprocessing block; and
    storing the storage parameter of the next adjacent validation-ready preprocessing block.

6. The computer-implemented method of claim 1, further comprising starting validation on the next adjacent validation-ready preprocessing block when the consensus parameter corresponding to the next adjacent validation-ready preprocessing block is obtained.

7. A non-transitory, computer-readable medium storing one or more instructions executable by a computer system to perform operations comprising:
    obtaining, by a blockchain node and in a service consensus stage, a validation-ready preprocessing block in a current consensus round;
    validating, by the blockchain node, the validation-ready preprocessing block;
    determining a consensus parameter corresponding to the validation-ready preprocessing block;

obtaining, based on the consensus parameter corresponding to the validation-ready preprocessing block, a consensus parameter corresponding to a next adjacent validation-ready preprocessing block; and in response to obtaining the consensus parameter corresponding to the next-adjacent validation-ready preprocessing block, performing, in parallel, by the blockchain node, processing of service data stored in the validated validation-ready preprocessing block and validation of the next adjacent validation-ready preprocessing block.

8. The non-transitory, computer-readable medium of claim 7, wherein obtaining the validation-ready preprocessing block includes the blockchain node generating the validation-ready preprocessing block based on service data stored by the blockchain node or obtaining the validation-ready preprocessing block from another blockchain node.

9. The non-transitory, computer-readable medium of claim 7, wherein the processing of service data is performed by using a predetermined processor.

10. The non-transitory, computer-readable medium of claim 9, wherein the processing of service data by using a predetermined processor further comprises, for the validated validation-ready preprocessing block:
    invoking a processor to obtain a storage parameter comprising a storage location;
    determining, based on the storage parameter, a process-ready preprocessing block corresponding to the storage parameter; and
    storing, in the storage location, service data of the process-ready preprocessing block.

11. The non-transitory, computer-readable medium claim 7, further comprising, upon validating the validation-ready preprocessing block:
    determining, based on the storage parameter of the validation-ready preprocessing block, a storage parameter of the next adjacent validation-ready preprocessing block; and
    storing the storage parameter of the next adjacent validation-ready preprocessing block.

12. The non-transitory, computer-readable medium of claim 7, farther comprising, starting validation on the next adjacent validation-ready preprocessing block when the consensus parameter corresponding to the next adjacent validation-ready preprocessing block is obtained.

13. A computer-implemented system, comprising:
    one or more computers; and
    one or more computer memory devices interoperably coupled with the one or more computers and having tangible, non-transitory, machine-readable media storing one or more instructions that, when executed by the one or more computers, perform one or more operations comprising:
    obtaining, by a blockchain node and in a service consensus stage, a validation-ready preprocessing block in a current consensus round;
    validating, by the blockchain node, the validation-ready preprocessing block;
    determining a consensus parameter corresponding to the validation-ready preprocessing block;
    obtaining, based on the consensus parameter corresponding to the validation-ready preprocessing block, a consensus parameter corresponding to a next adjacent validation-ready preprocessing block; and
    in response to obtaining the consensus parameter corresponding to the next-adjacent validation-ready preprocessing block, performing, in parallel, by the blockchain node, processing of service data stored in the validated validation-ready preprocessing block and validation of the next adjacent validation-ready preprocessing block.

14. The computer-implemented system of claim 13, wherein obtaining the validation-ready preprocessing block includes the blockchain node generating the validation-ready preprocessing block based on service data stored by the blockchain node or obtaining the validation-ready preprocessing block from another blockchain node.

15. The computer-implemented system of claim 13, wherein the processing of service data is performed by using a predetermined processor.

16. The computer-implemented system of claim 15, wherein the parallel data processing by using a predetermined processor further comprises, for the validated validation-ready preprocessing block:
    invoking a processor to obtain a storage parameter comprising a storage location;
    determining, based on the storage parameter, a process-ready preprocessing block corresponding to the storage parameter; and
    storing, in the storage location, service data of the process-ready preprocessing block.

17. The computer-implemented system of claim 16, further comprising, upon validating the validation-ready preprocessing block:
    determining, based on the storage parameter of the validation-ready preprocessing block, a storage parameter of the next adjacent validation-ready preprocessing block; and
    storing the storage parameter of the next adjacent validation-ready preprocessing block.

* * * * *

UNITED STATES PATENT AND TRADEMARK OFFICE
CERTIFICATE OF CORRECTION

PATENT NO. : 10,686,803 B2
APPLICATION NO. : 15/992918
DATED : June 16, 2020
INVENTOR(S) : Wang Page 1 of 1

It is certified that error appears in the above-identified patent and that said Letters Patent is hereby corrected as shown below:

In the Claims

Column 21/ Line 33 (Approx.), In Claim 11, after "medium" insert -- of --.

Column 21/ Line 43 (Approx.), In Claim 12, delete "farther comprising," and insert -- further comprising --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*